(No Model.) 4 Sheets—Sheet 1.
L. H. NASH.
OSCILLATING WATER METER.

No. 336,140. Patented Feb. 16, 1886.

WITNESSES
INVENTOR
Lewis Hallock Nash
by Johnson & Johnson
Attorneys (No Model.)  4 Sheets—Sheet 2.

L. H. NASH.
OSCILLATING WATER METER.

No. 336,140.  Patented Feb. 16, 1886.

WITNESSES  INVENTOR
Jessie B. Johnson.  Lewis Hallock Nash
D. E. Grant  by Johnson and Johnson
  Attorneys.

(No Model.) 4 Sheets—Sheet 3.

L. H. NASH.
OSCILLATING WATER METER.

No. 336,140. Patented Feb. 16, 1886.

WITNESSES
Bessie P. Johnson
R. S. Grant

INVENTOR
Lewis Hallock Nash
by Johnson & Johnson
Attorneys.

(No Model.) 4 Sheets—Sheet 4.
L. H. NASH.
OSCILLATING WATER METER.
No. 336,140. Patented Feb. 16, 1886.
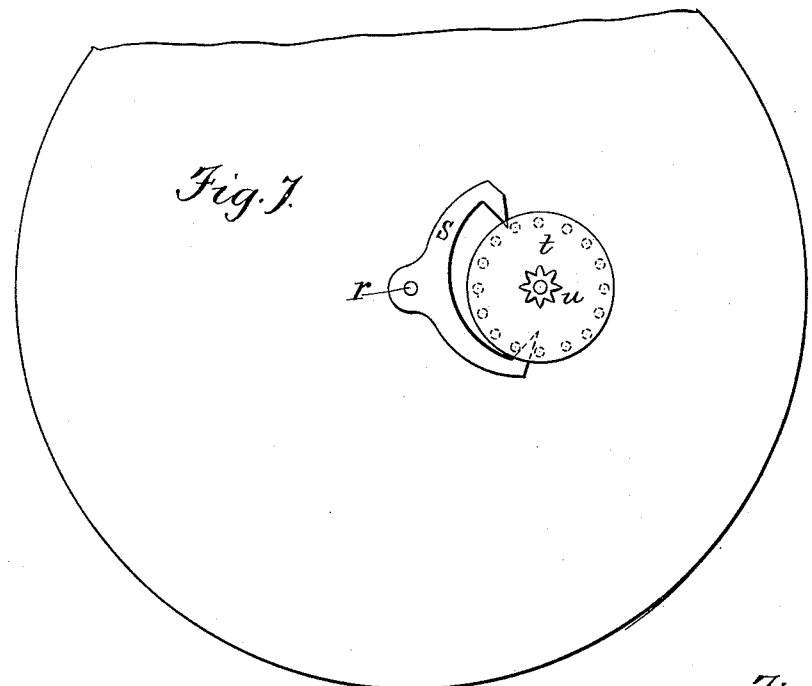
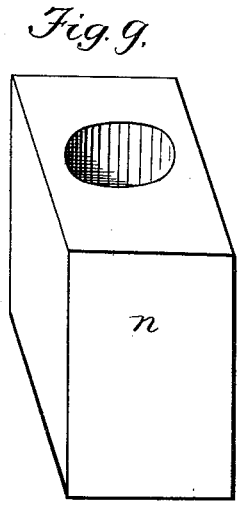
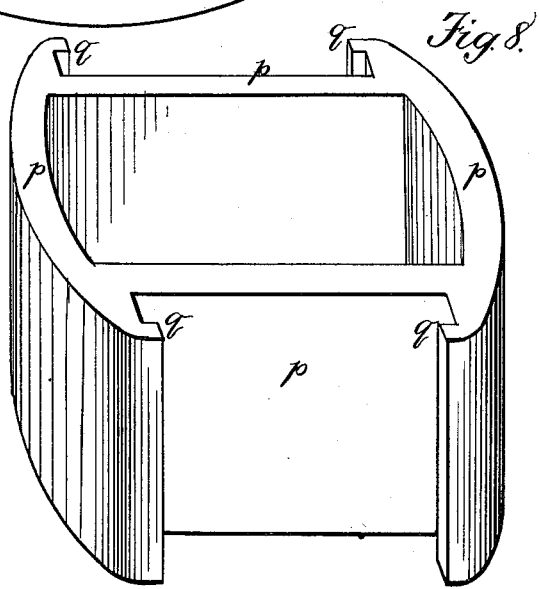
WITNESSES
Bessie P. Johnson.
R. E. Grant
INVENTOR
Lewis Hallock Nash
by Johnson & Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

OSCILLATING WATER-METER.

SPECIFICATION forming part of Letters Patent No. 336,140, dated February 16, 1886.

Application filed September 22, 1885. Serial No. 177,847. (No model.)

*To all whom it may concern:*

Be it known that I, LEWIS HALLOCK NASH, a citizen of the United States, residing at Brooklyn, in the county of Kings and State of New York, have invented new and useful Improvements in Oscillating Water-Meters, of which the following is a specification.

In an application for a patent for improvement in water-meters filed by me of even date herewith I have described, claimed, and shown a piston having the form in cross-section of a trough of rectangular sides, and a movement describing a path defined by a rectilinear line between guides terminating in a swinging movement upon and between the same guides, as contradistinguished from a piston having a continuous movement in curved lines, as in my patents of June 17, 1884, and June 23, 1885, whereby, in connection with radial abutments extending into the case-chamber, to divide it into alternately enlarging and contracting receiving and discharging spaces.

My present improvement embraces a piston having substantially the same movement within the measuring-chamber and dividing it in substantially the same way by wall conformations.

For carrying out my present improvement I employ a piston having the section of a hollow rectangular body or closure containing a movable abutment-piston, over which the piston proper has a rectilinear movement and forms a guide bearing or fulcrum for the piston in its swinging movements also, being for this purpose mounted upon a fixed central pivot of the case and fitted to the walls of the piston-closure, so that while the piston is always free to slide over the walls of this pivoted piston-abutment the latter is free to have a swiveling movement in consonance with the swinging movement of the piston, whereby the pressure of the water is caused to act within and without the piston, and thereby increase the quantity of the discharge.

Figure 1:
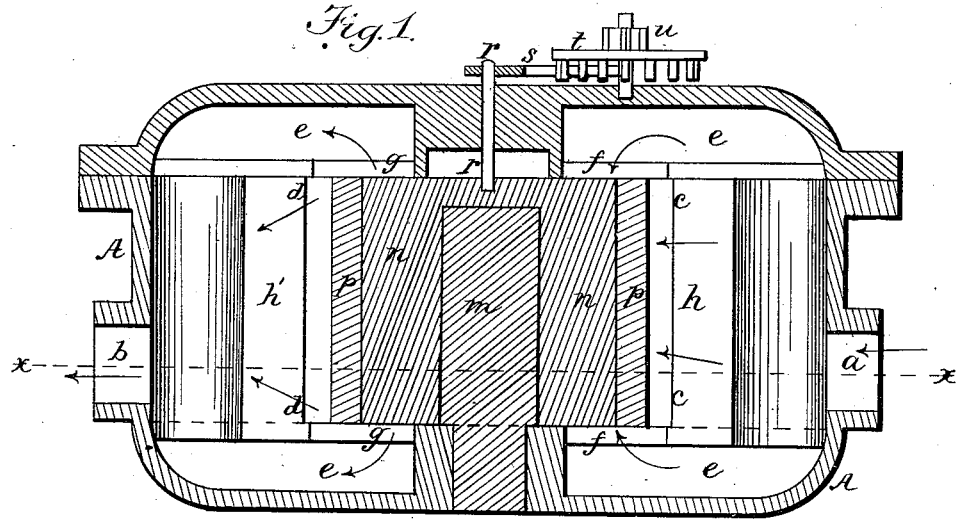
Figure 2:
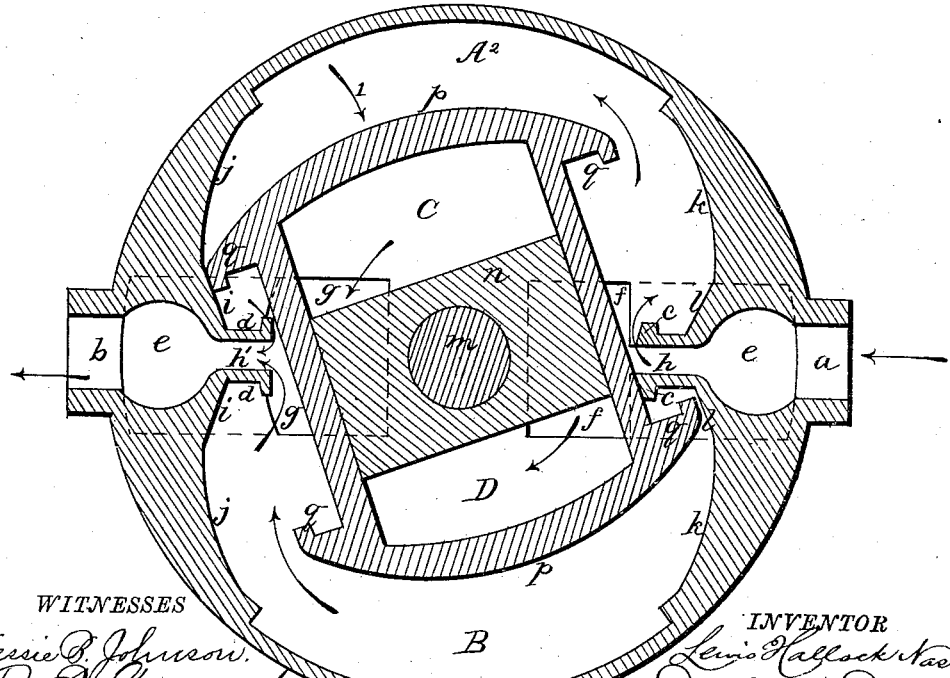
Figure 3:
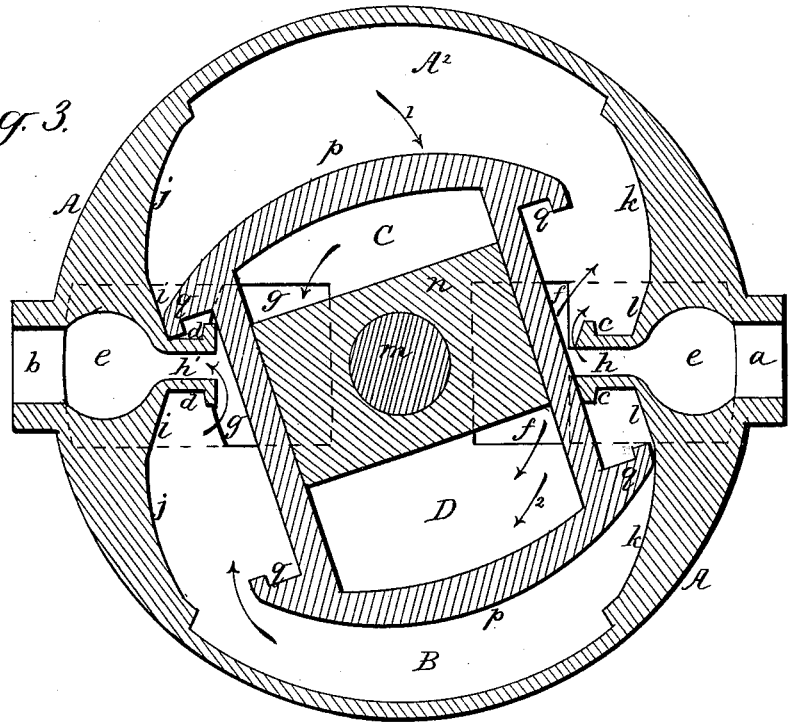
Figure 4:
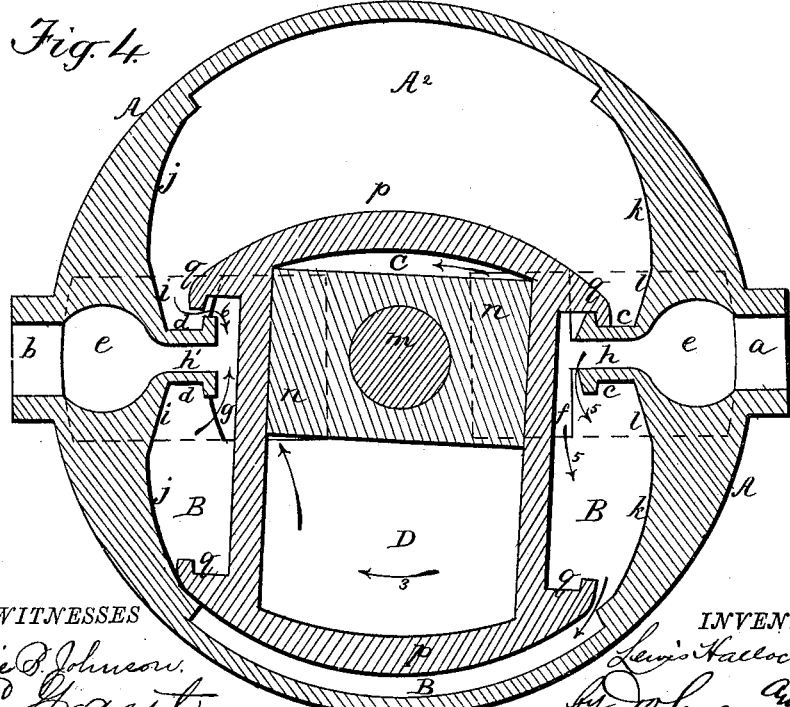
Figure 5:
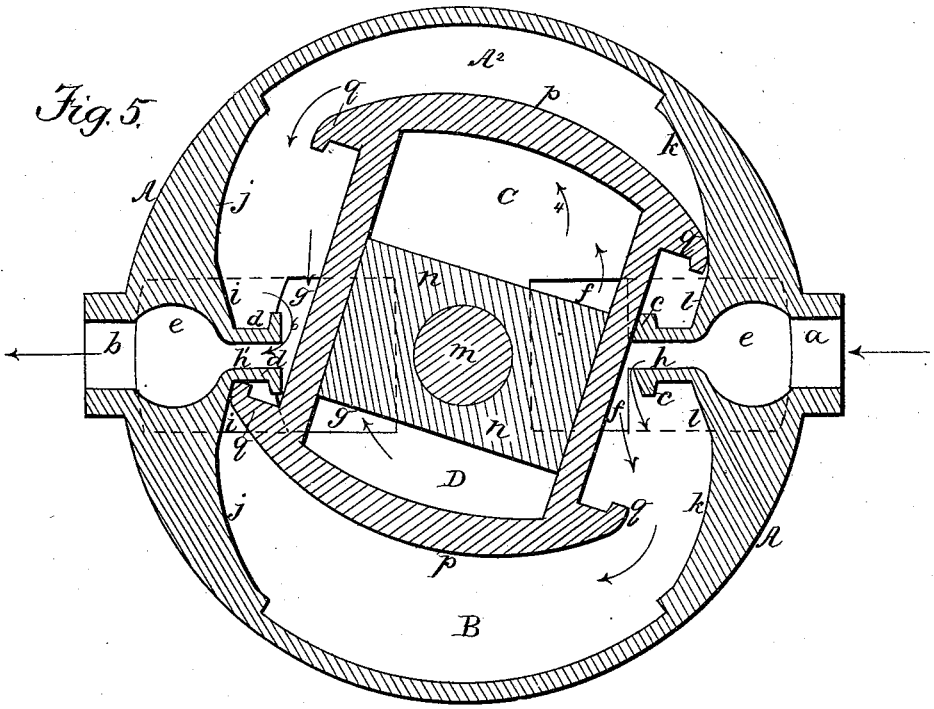
Figure 6:
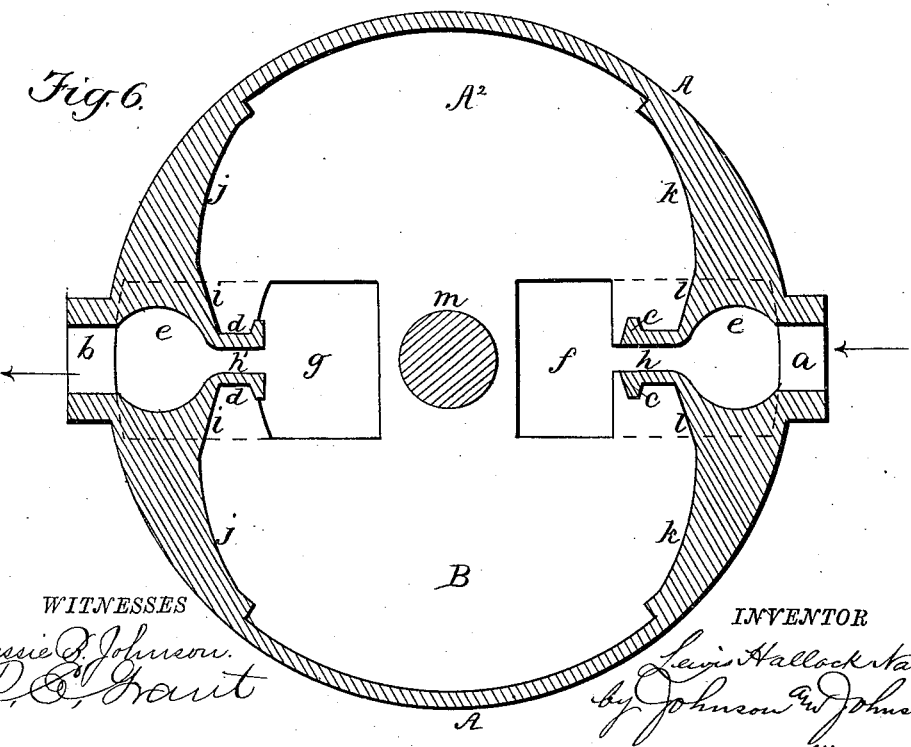

Referring to the accompanying drawings, Figure 1 represents a vertical section of a meter embracing my improvements. Figs. 2, 3, 4, and 5 are horizontal sections of the same, taken on the line $x\ x$ of Fig. 1, showing the piston in different positions; Fig. 6, a similar section, the piston removed. Fig. 7 shows a top view of the case with the register-connecting mechanism; and Fig. 8 shows the piston in perspective, and Fig. 9 the swiveling piston-abutment.

The case A is preferably of cylindrical form and has the inlet and the outlet passages $a$ and $b$, formed within hollow abutments $c$ and $d$, which extend a short distance into the case-chamber at opposite points thereof. The case is preferably formed with top and bottom passages, $e$, within the chamber-heads, which communicate direct with the inlet and outlet passages, and also with the chamber, by the top and bottom ports, $f$ and $g$, which extend into the case chamber and are operated, by the abutment-piston in a manner which I shall presently describe.

The abutment-ports $h$ and $h'$ extend from head to head of the case chamber, and are controlled by the movements of the piston to control the flow into and from the measuring-chambers. The abutments are so formed as to make joint-bearings, having projecting ribs for this purpose extending from head to head of the case-chamber, and thereby have direct communication with the top and bottom chamber-ports. On each side of these abutments the vertical chamber-wall is formed with straight surface-sections $i$ and $l$, and curved surface parts $j$ and $k$, which latter terminate in the clearance-space of said chamber, and these wall conformations control the dividing function of the piston.

Centrally the case-chamber has a fixed cylindrical stud, $m$, upon which is fitted the abutment-piston $n$, so as to be free to have a swiveling movement in accordance with and controlled by the movement of the piston proper. This abutment-piston is a solid block, $n$, extending from head to head of the case, and has a width much less than the length of the interior space of the piston to allow of the proper movement of the latter. The piston $p$ is of peculiar construction, having the form of a hollow rectangle, in which the walls of its four inner sides and of its four outer sides stand vertical in the chamber-case. Its side closure-walls fit snugly the ends of the abutment-piston, and being parallel will allow the hollow piston to move over the abutment-piston. The ends of the hollow piston p and the abutment-piston n stand in the same horizontal planes, and form joint-forming contacts with the inner walls of the top and of the bottom of the case-chamber. The outer end walls of the piston are preferably curved, and its four outer corners are formed with joint-forming projections q, adapted to make contact-bearings, respectively, with the wall-ribs c c d d of the abutments h h' in the movements of the piston in the case-chamber, which it continually divides into constantly enlarging and diminishing receiving and discharging chambers by the action of the water admitted and discharged from the piston-closure on the opposite sides of the abutment-piston. The admission and discharge of the water into and from the piston-closure and into and from the case-chamber spaces are controlled by the swinging movement of the piston.

The registration of the flow is effected by the action of the swinging movement of the abutment-piston, as follows, viz: A shaft, r, is secured centrally in the top of the abutment-piston, and passes through the case-cover, carrying on its outer end an escapement, s, which drives an escapement-wheel, t, which in turn operates the dial mechanism by means of a pinion, u, as shown in Figs. 1 and 7. I may, however, use any other form of register connecting and operating mechanism.

The movement of the piston controls the operation of the meter as follows, viz: The piston being in the position shown in Fig. 2, the flow enters from the passages e into the case-chamber space $A^2$ through the ports f f and h, and into the piston-space D, filling said spaces, and by its pressure moves the piston in the direction of the arrow 1, and at the same time the water escapes from the case-chamber space B through the ports g g and h', and also from the piston-closure space C through the ports g g, driving the piston into the position shown in Fig. 3. In this movement the piston projection q rides upon the straight case-wall part i at the outlet side, while the outer wall-bearing of the piston forms contact with the bearing c of the case at the inlet side thereof, dividing the case-chamber into the receiving and discharging spaces. In this position the piston corner-bearing q makes contact with the corresponding bearing, d, at the outlet side of the case, while the opposite oblique corner-bearing of the piston makes contact with the curved part k of the case-wall at the inlet side, which causes the piston to swing in the direction of the arrow 2 toward the position shown in Fig. 4. As the piston is thus swinging it separates the bearing c, allowing the water to flow into chamber B on the inlet side of the piston, as at arrow 5, causing the piston to move in the direction of the arrow 3, carrying the piston-bearing q upon the wall j, and separating the bearings q and d, allowing the water to escape from chamber $A^2$ to the outlet, as at arrow 6. The piston now commences its return-stroke along the walls j and i into the position shown in Fig. 5, at which time contact is made by the oblique piston corner-bearings at d q and k q, at which moment it commences its swinging movement in the opposite direction (shown by arrow 4) to the point of beginning. (Shown in Fig. 2.) In this movement the piston describes an orbit consisting of a forward movement in a straight line, a swinging movement, a return movement in a different direction of right line, and a swinging movement back to the point of beginning. It is during these swinging movements that the piston proper and its co-operating inclosed abutment-piston operate to control the flow into and from the measuring-chambers.

The piston in describing the path which I have described—viz., a movement in a rectilinear line, terminating in a swinging movement upon the abutment-piston as a fulcrum—is so moved with an easy and free action by the pressure of the water into and through the meter-case, as the piston divides the latter into receiving and discharging spaces.

I claim—

1. The combination, in a water-meter, of a case having two interior opposite wall-abutments, suitable interior wall-bearings, and inlet and outlet ports, and an abutment-piston pivoted within the case-chamber between the said abutments, with a piston having the form of a hollow rectangle adapted to divide the case-chamber, and to receive and be divided by said abutment-piston into receiving and discharging spaces by the movement of said piston, substantially as described, for the purpose specified.

2. The combination, in a water-meter, of a piston having the form of a hollow rectangle having a movement substantially as described, with a case having a pivoted abutment-piston, and suitable interior wall joint-forming bearings, and inlet and outlet ports, substantially as described, and for the purpose specified.

3. The combination, in a water-meter, of a piston having the form of a hollow rectangle, and having corner joint-forming projections q, with a case having joint-forming interior wall-abutments, c and d, forming the inlet and the outlet ports h h', straight and curved interior wall conformation, k and l, and a central stud, m, and abutment piston n, pivoted within the said piston for operation, substantially as described, in connection with inlet and outlet top and bottom case-ports f and g, and said inlet and outlet abutment-ports.

4. The combination, in a water-meter, of a piston having the form of a hollow rectangle adapted to divide the case-chamber into alternately enlarging and contracting receiving and discharging spaces, with an abutment-piston pivoted within said piston-closure, dividing the latter into receiving and discharging spaces, and controlled in such division by the movements of said piston, in connection with the inlet and the outlet case-ports, substantially as described.

5. The meter-case having the top and bottom ports, $f$ and $g$, and the abutments $c$ and $d$, having inlet and outlet ports extending from head to head of the case, in combination with a piston having the form of a hollow rectangle, and an abutment-piston pivoted to the case within said piston-closure, controlled by the movements of the latter, which describe a path defined by a rectilinear line between said abutments, terminating in a swinging movement upon said abutment-piston as a fulcrum, substantially as described.

6. In a water-meter, the combination, with a chamber-dividing piston having a hollow rectangular form, of an abutment-piston, forming a pivoted fulcrum for said hollow piston, and dividing the interior of the latter in the manner and for the purpose specified.

7. The combination, in a water-meter, of a piston having the form of a hollow rectangle operating to divide the case-chamber, as described, with an abutment-piston pivoted to the case within the piston-closure to divide it as described, with suitable register-connecting mechanism connected with and operated by the swiveling movements of said pivoted abutment-piston, as stated.

In testimony whereof I have hereunto set my hand in the presence of two subscribing witnesses.

LEWIS HALLOCK NASH.

Witnesses:
A. E. H. JOHNSON,
J. W. HAMILTON JOHNSON.